Aug. 25, 1964

C. M. SWEET 3,145,600

TANDEM LATHE TOOLS THAT ADJUST THE THICKNESS
OF THE CHIP BY ROTATING

Filed July 15, 1960

INVENTOR.

Corliss M. Sweet.

INVENTOR.
Corlies M. Sweet.
BY

Aug. 25, 1964

C. M. SWEET 3,145,600

TANDEM LATHE TOOLS THAT ADJUST THE THICKNESS
OF THE CHIP BY ROTATING

Filed July 15, 1960

INVENTOR.

Corlise M. Sweet

BY

FIG. 13
FIG. 12
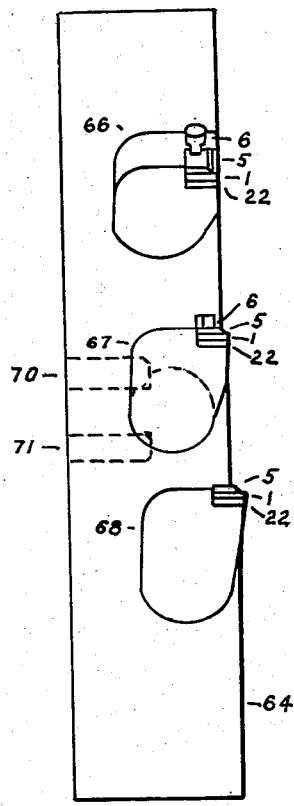
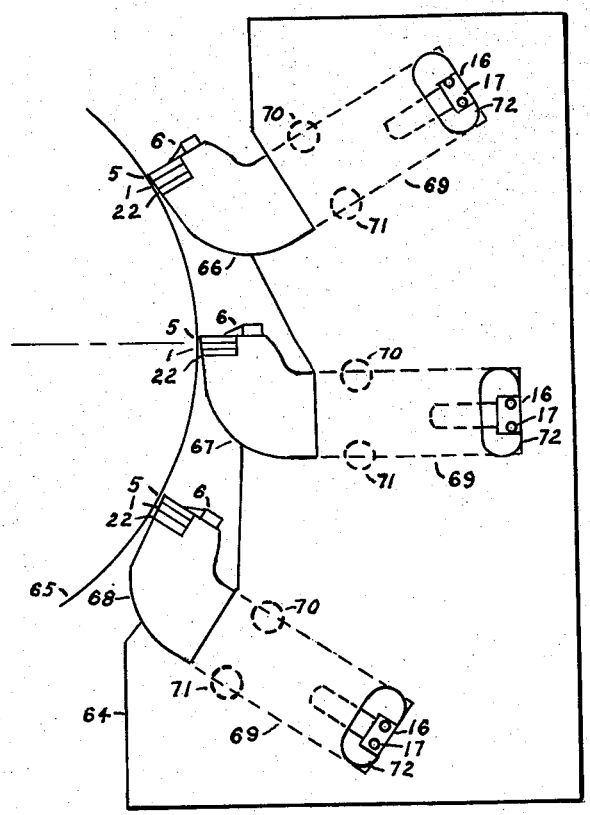
INVENTOR.
Corlise M. Sweet
BY

United States Patent Office 3,145,600
Patented Aug. 25, 1964

3,145,600
TANDEM LATHE TOOLS THAT ADJUST THE THICKNESS OF THE CHIP BY ROTATING
Corlise M. Sweet, 1000 E. Montana St., Milwaukee, Wis.
Filed July 15, 1960, Ser. No. 43,218
8 Claims. (Cl. 82—36)

This invention relates to tandem turning in a lathe and especially to a new method of adjusting the thickness of the chip by rotating the cutting elements.

In my other patent applications, Serial Number 264,548 filed Jan. 2, 1952 and now abandoned, Number 654,249 filed April 22, 1957, and now abandoned, Number 30,902 filed May 23, 1960, and Patent 3,078,547 it was shown how by using tandem cutting tools more metal could be removed, better tool life could be obtained, harder cutting elements could be used, how one cutting element can support another cutting element to give a better cutting action, and how workpieces can be machined more uniform in size.

The tools described above did not use the principle of rotating the cutting elements to change the amount that each cutting element can cut. Combining the rotation of cutting elements with other features will provide less expensive and more versatile tandem tools as will be shown below.

It is therefore an object of this invention to show a new method of adjusting the cutting elements by rotation that will permit all the cutting elements in a tandem tool to cut a thick chip for rough turning a workpiece, and by quickly rotating the cutting elements all the cutting elements can cut a thin chip for finish turning the work piece, and in this way all the cutting elements can be used for roughing and finishing the same workpiece.

Another object is to show how two cutting elements can be adjusted for cutting a different thickness of chip by rotating and also can be adjusted for cutting to the same radial depth by disposing the round section of the shank that supports the cutting elements at a slight angle, and providing means to adjust the shank along the angle, thereby raising or lowering the cutting elements.

A further object is to show that by using the principle of adjusting the thickness of chip cut by rotation the cost of the tandem tool can be reduced.

Another object is to show how a tandem tool can be adjusted to cut a range in diameters and can be rotated to change the thickness of the chips cut by the various cutting elements can be assembled in a square turret in such a way that the tandem cutting tool elements do not protrude farther from the turret that the cutting elemens in other positions of the turret.

A further object is to show a dual purpose tandem tool that can be rotated to change the thickness of the chips cut, can be quickly adjusted for different size diameters, and can be used as single tool on all diameters smaller than for which the two cutting elements are set.

A still further object is to show how different wedge shaped shims can be placed under the insert cutting elements to make it possible for the tandem tool to cut a different range in diameters.

In the drawings:

FIGURE 12 is a schematic side elevation of a tandem tool having three cutting elements each of which can be adjusted endways for cutting different diameters, and each can be rotated by a threaded means to change the thickness of the chips cut by the individual cutting elements.

FIGURE 13 is a schematic end view of FIGURE 12 looking at it from the left hand side showing how the cutting elements are supported on a round surface that provides a means for rotating the cutting element.

Figure 1:
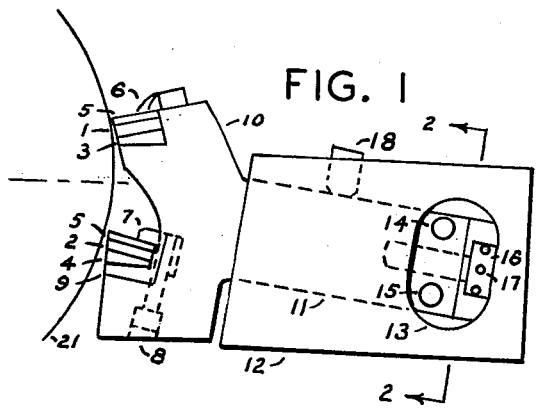
FIGURE 1 is a schematic side elevation of a two cutting element tandem tool that has insert cutting elements supported on taper shims, and both cutting elements are supported by a shank having a round surface that has a threaded means to rotate it, and a threaded means to adjust it along an incline to raise or lower the cutting elements whereby both cut to the same radial depth.

The construction shown in FIGURE 1 has two insert cutting elements 1 and 2 that are located equal distances above and below the center line, and are supported on wedge shaped shims 3 and 4. The inserts are the same as used on single point lathe cutting tools. They usually vary from ⅛ to ¼ inch in thickness, and can be of the square, triangular or round shape. They are made of various hard materials such as carbides or ceramics. Both cutting elements have chip breakers 5 which can be eliminated when cutting cast iron. Cutting element 1 is held by clamp 6 and a screw not shown. Cutting element 2 is held down by clamp 7 and screw 8. Wedge 4 is held by part 9 that is machined and brazed in place. The cutting elements have a cutting element holder 10 that has a round shank 11. The shank 11 is held in a tandem tool holder 12. Tandem tool holder 12 has an opening 13 that provides access to adjustment screws 14 and 15 that can be used to rotate the cutting elements 1 and 2 to dispose them for cutting the correct thickness of chip on each cutting element. Screw 16 has small holes 17 that can be used to rotate the screw to adjust the shank along the inclined surface on 12 thereby raising or lowering cutting elements 1 and 2 and causing them to cut to the same radial depth. Screw 18 is for clamping the assembly, and is not required if either the screws 14 or 15 are tightened. Half round part 19 provides a surface for screws 14 and 15 to bear against.

In practice the shank 11 would be placed in the tandem tool holder 12, and the screw 16 would be adjusted to raise or lower the cutting elements 1 and 2, so that they just touch the outside diameter of the workpiece 21. The cutting elements can then be adjusted so that each cuts the desired thickness of chip. When it is desired to have an equal load on each cutting element, the lower cutting element 2 is offset beyond the upper cutting element, in the direction the lathe carriage is travelling, an amount equal to approximately one half the distance the lathe carriage travels during one revolution of the workpiece. An example of this is as follows. If it is desired to have each cutting element cut a .025 inch thick chip, the lathe would be set to advance the carriage .050 inch along the workpiece axis, for each revolution of the workpiece, and the lower cutting element 2 would be offset approximately .025 inch beyond the upper cutting element 1 in the direction the lathe carriage is moving. A formula to determine the exact amount of offset can be found in application Serial Number 30,902.

When the tandem tool is adjusted for the holder it can be taken out and replaced with little or no adjustment. This can be done by loosening either screw 14 or 15, removing the holder, then later replacing the holder, and tightening the same screw. The screw should be tightened with a torque wrench.

Changing the taper on the shims 3 and 4, so they have more taper or no taper, will cause the cutting elements 1 and 2 to change their rake angle. This will allow the cutting element holder to be used on a greater range of workpiece diameters.

The tandem tool holder 12 is shown as a block. This holder could be incorporated into a square turret or into other types of tool holders.

Figure 2:
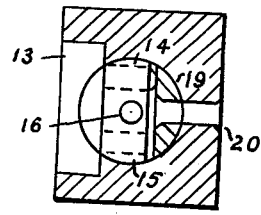
FIGURE 2 is a cross section of FIGURE 1 showing an opening on the side of the holder to provide access to two screws for rotating the tool holder shank, and another screw to adjust the shank along the incline.
Figures 3, 4:
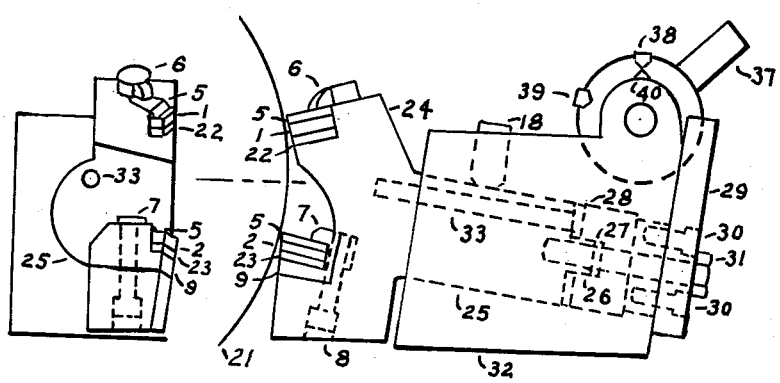
FIGURE 3 is a schematic side elevation of a two cutting element tandem tool supported on a round shank with a threaded means for adjusting the cutting elements along an incline to cause both cutting elements to cut to the same radial depth, and a cam arrangement to provide a quick means to rotate the shank, and thereby change the thickness of the chips cut on all the cutting elements.
FIGURE 4 is an end elevation of FIGURE 3 looking at it from the left hand side showing the cutting elements, the holder, and a part of the round shank that supports the cutting elements.
Figure 5:
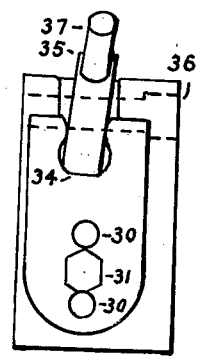
FIGURE 5 is a schematic end elevation of FIGURE 3 looking at it from the right side showing the cam arrangement to rotate the round tandem tool shank.

The construction shown in FIGURES 3, 4, and 5 is very similar to the construction shown in FIGURES 1 and 2. The main difference is that it has a mechanical reduction means that provides a quick method of rotating the cutting elements either by hand or a linkage on the lathe. The insert cutting elements 1 and 2 are supported by shims 22 and 23 that have parallel sides. The shims could be tapered similar to 3 and 4 in FIGURE 1. The cutting element tool holder 24 has a round shank 25 that has a key 26 milled on the end that fits in a keyway 27 in part 28. Part 28 is held to part 29 by screws 30. A screw 31 holds the round shank 25 in the tandem holder 32. The cutting element holder 24 is raised or lowered by a thread means shown as screw 33 that moves the shank 25 along the inclined surface it rests on. Shank 25 is rotated by arm 29 which has a slot 34 in which the cam 35 slides. Cam 35 is mounted on a shaft 36 that has a thread on one end that holds the shaft to the holder 32. The cam 35 is rotated by lever 37. The cam has spring clips 38 and 39 that can be adjusted to any position to line up with pointer 40. The spring clips will show the machine operator how far to move the lever 37 when changing from a coarse feed to a fine feed in machining a workpiece.

The above tandem tool is shown mounted in a block 32. It could be mounted in a turret or some other type of tool construction.

The means of changing the thickness of the chips cut by cutting elements is accomplished by hand lever 37, and changing the amount the carriage advances along the work piece axis for each revolution of the workpiece. Instead of a hand lever this could be a linkage or an electrical means. When the tool is used on an automatic lathe it would have to be some other means besides hand control.

The screw 18 is not intended to lock shank 25 except on special jobs. It is placed in the holder as a safety factor to take upon any clearance there may be between the shank 25 and the tandem tool holder 32.

This cutting element holder is similar to the cutting element in FIGURE 1 in that once adjusted it can be taken out of the block 32 and replaced with little or no adjustment. All that will be necessary in using the tool is to replace or index the precision ground insert cutting elements 1 and 2 as they wear.

Figure 6:
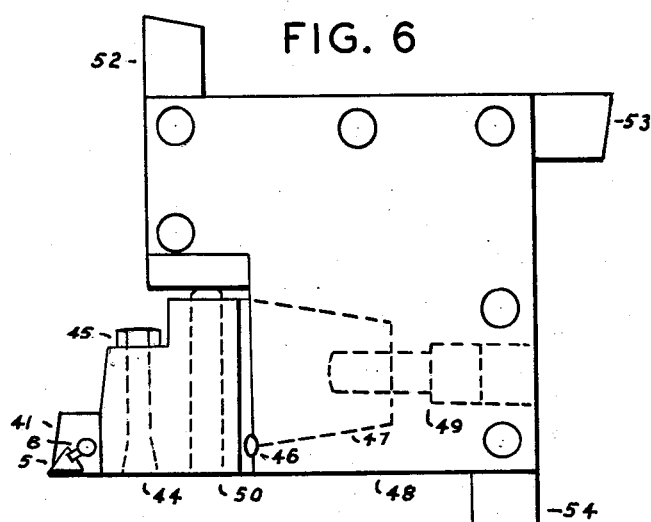
FIGURE 6 is a schematic plan view of a square turret that is recessed to receive a tandem tool supported on a taper shank that can be rotated to change the thickness of the chips cut by the cutting elements.
Figure 7:
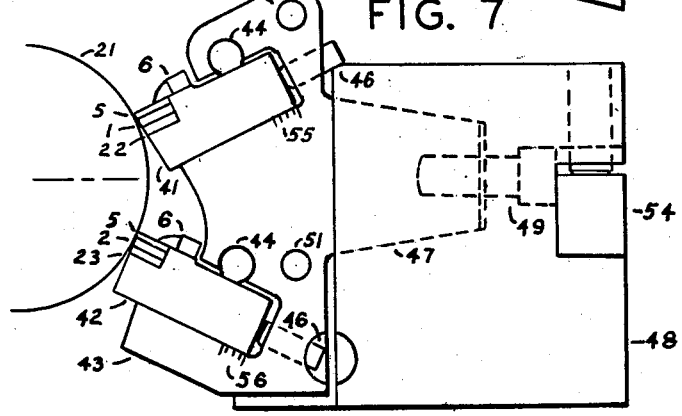
FIGURE 7 is a schematic side elevation of FIGURE 6 showing a tandem tool having two cutting elements that can be adjusted endways for turning different size diameters and a threaded means to rotate the tandem tool thereby changing the thickness of the chips cut by the cutting elements.
Figure 8:
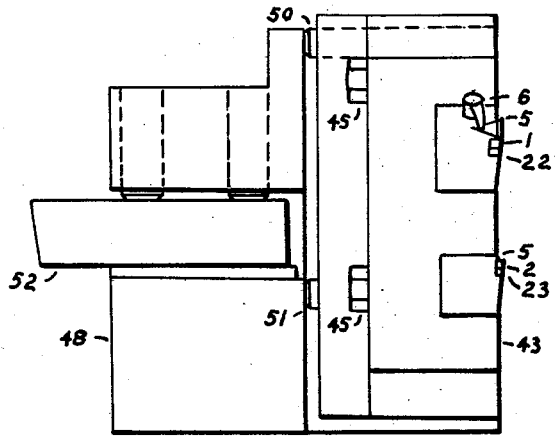
FIGURE 8 is a schematic end elevation of FIGURE 7 looking at it from the left hand side showing the two cutting elements, the threaded means to rotate the tandem cutting elements, and another single cutting element in the turret for doing a different cutting operation.

The tandem tool construction shown in FIGURES 6, 7, and 8 shows a cutting holder having a round shank that is tapered, mounted in a square turret. The cutting elements 41 and 42 are shown as standard lathe tools. If desired they could have a key milled on their bottom surface to improve their sliding action in the cutting element holder 43. Cutting element 41 is held by wedge bolt 44 and nut 45. Cutting element 42 is held by the same type of bolt and nut. Both cutting elements are adjusted endways by screws 46. The cutting element holder 43 has a taper shank 47 that is held in the square turret 48 by a cap screw 49. The cutting element holder 43 is rotated by screws 50 and 51 to change the thickness of the chips cut by the cutting elements. Other cutting elements in the square turret are 52, 53, and 54.

One of this tool's advantages is that after it has been set to cut a certain range in sizes, it can be removed and replaced with little or no adjustment. The adjustment of the cutting elements for various size diameters is made easy by the scale 55 and 56.

If it is desired to use this cutting element holder on other size work pieces that would be too large or too small for the adjustments along scales 55 and 56, cutting elements having different rakes can be used as shown in application Serial Number 654,247.

Figure 9:
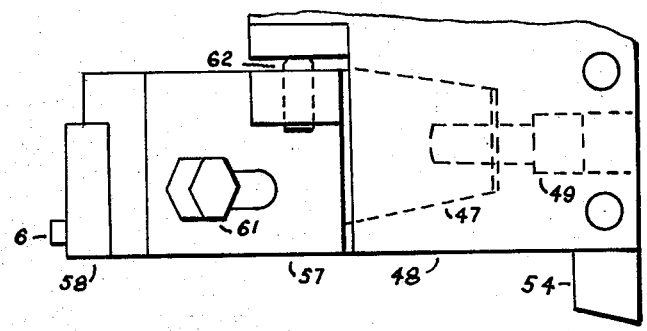
FIGURE 9 is a schematic plan view of a two cutting element tandem tool for use on small diameters that can be placed in the square turret of FIGURE 6 by use of a taper shank and has a threaded means of rotating the shank for changing the thickness of the chips cut by the cutting elements.
Figure 11:
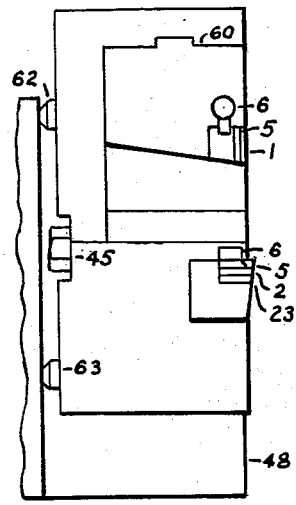
FIGURE 11 is a schematic end view of FIGURE 10 looking at it from the left hand side showing the cutting elements and the threaded means to rotate the tandem tool to change the thickness of the chips cut by the cutting elements.
Figure 10:
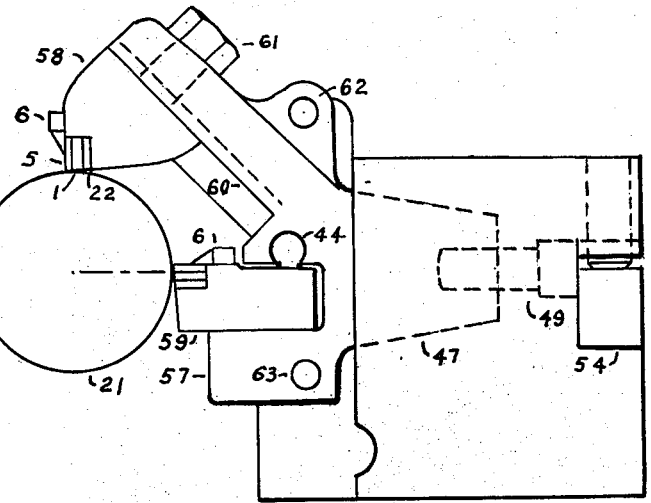
FIGURE 10 is a schematic side elevation of FIGURE 9 showing a lower cutting element that cuts on the horizontal center line, an upper cutting element that cuts at ninety degrees to the lower cutting element, an inclined surface to adjust the upper cutting element for different diameter workpieces, and screws to rotate both cutting elements to change the thickness of the chips cut.

The tandem tool construction shown in FIGURES 9, 10, and 11 can be used in the turret in place of the tool shown in FIGURES 6, 7, and 8. The cutting element holder 57 has cutting elements 58 and 59. Cutting element 58 can be adjusted along inclined surface 60 for cutting different size diameters. Cutting element 58 is held in place by nut 61. Cutting element 59 cuts on the center line of the workpiece and will cut on all size diameters. The cutting element holder can be rotated by screws 62 and 63 to change the thickness of the chips cut by the cutting elements.

This cutting element holder has three advantages. The top cutting element 58 being mounted on a 45 degree slide can easily be adjusted for cutting a wide range of small diameters by moving the cutting element along the slide 60. When both cutting elements are adjusted for cutting a certain size diameter, the lower cutting element can be used for cutting any smaller diameter without interference from the upper cutting element. When it is desired not to tandem turn a workpiece the upper cutting element 58 can be removed on the square turret can be used like a conventional square turret.

In FIGURE 10 the cutting element 58 is located on surface 60 that is at a 45 degree angle with the center line. It is not necessary that surface 60 be at a 45 degree angle. When this design is to be used on larger diameter workpieces the 45 degree angle for the slide 60 can be made larger. This will make the angle between the two cutting elements less than 90 degrees and the tandem tool will be smaller.

The tandem tool construction shown in FIGURES 12 and 13 shows three cutting elements in a tandem tool holder 64 that are cutting a larger diameter workpiece 65. Cutting elements 66, 67, and 68 are all similar.

Each cutting element has a round shank 69 that can be rotated by a threaded means consisting of screws 70 and 71. The screws 70 and 71 adjusts the thickness of the chip cut by the cutting element and they also lock the cutting element in place. The tandem tool holder 64 has milled slots 72 at the bottom of the bored holdes that hold the cutting elements. The slots provide an opening to adjust the cutting elements endways by means of cap screws 16 that have holes 17 for adjusting the cap screws.

One method of operating the tandem tool is as follows: FIGURE 13 shows cutting element 68 offset to the right of cutting element 67. Cutting element 67 is shown offset to the right of cutting element 66. The mount of offset will depend on the smoothness of the finish surface desired, the amount of power available, the the kind of metal being turned, and the kind of cutting element being used. For example if it is desired that each tool cut a .025 inch thick chip then each cutting element will be offset approximately .025 inch from each other and the lathe carriage will be set to advance tandem tool .075 inch along the workpiece axis for each revolution of the workpiece. When the tandem tool and the lathe feed mechanism are adjusted in the manner described each cutting element will cut a separate helical path on the workpiece.

The above is a very simple tandem tool. It is easy to manufacture and easy to adjust. When the cutting elements wear all that is necessary is to index the insert cutting elements 1 or replace them.

The tandem tool shows three cutting elements but it could contain any number. It has the advantage that each cutting element can be adjusted individually. If desired the whole tool could be placed on a round shank similar to FIGURE 3 or 7. When the whole tool is mounted on a round shank it would be easy to place in a lathe or boring mill, and the cutting elements could be adjusted individually or as a group.

All the above tandem tools have the thickness of the chip cut by the cutting elements adjusted by rotating the tool shank. Ordinarily this would not be good as it would change the clearance on the side of the cutting element and either provide the cutting element with too much clearance or not enough. The designs shown above, when properly made, only require about one degree of rotation to adjust the chip thickness cut by the cutting elements. This amount of change will not affect the cutting on most workpieces.

Means of adjusting the cutting elements by moving them up or down or adjusting them endways has been incorporated in all the tools. This is important as the helical grooves made by the cutting elements are more visible when the cutting elements do not cut to the same depth.

Most of the designs show two cutting elements, one cutting above the center line and the other cutting an equal distance below the center line. The advantage to this is that the same tandem tool can be used on more than one diameter to cut a smooth surface.

Various embodiments of the invention may be employed within the scope of the accompanying claims, which will particularly point out and distinctly set forth the subject matter regarded as the invention.

I claim:

1. A lathe turning tool, comprising a tandem tool holder that has a cutting element holder that can rotate, said cutting element holder having a shank that can be rotated about its longitudinal axis, said cutting element holder having at least two cutting elements mounted one above the other, said cutting element holder having means of holding said cutting elements substantially the same distance from the lathe's center of rotation at the correct angle for cutting, at least one of said cutting elements being offset from the cutting element above it in the direction the cutting elements move when cutting whereby said cutting elements will cut adjacent helical sections from the workpiece when the proper lathe feed is used, and mechanical means of rotating said shank about its longitudinal axis to offset said lower cutting element from the cutting element above it in a direction the cutting elements move whereby the lathe feed can be divided substantially equally between the cutting elements or one cutting element can be adjusted to cut a thick chip and another cutting element can be adjusted to cut a thin chip.

2. In a tandem tool holder a cutting element that can be used with at least one more cutting element for turning one diameter on a workpiece, comprising a cutting element having an eccentric on one end, said eccentric having a cutting insert mounted on it in a position for cutting, said cutting element having means that will allow it to be rotated about its longitudinal axis and locked in place whereby said cutting element can be offset with respect to another cutting element in a direction parallel to the lathe's center line of rotation to permit said cutting element to cut in tandem with another cutting element.

3. The construction of claim 1 in which the cutting element holder shank is mounted on an inclined surface in the tandem tool holder and means are provided in said holder to adjust said shank along said incline thereby adjusting the upper cutting element the same distance above the center of rotation as the lower cutting element is below the center of rotation.

4. The construction of claim 1 in which the cutting elements are insert cutting elements that are mounted on taper shims thereby by changing the shims underneath said insert cutting elements from shims having one taper to shims having different tapers the angle of the cutting elements with respect to the workpiece circumference is changed whereby workpieces of different diameters can be cut with the same tandem holder.

5. The construction of claim 1 in which the means to rotate the cutting elements is a mechanical reduction means that will quickly rotate the cutting elements thereby providing a tandem tool that can have the cutting elements quickly adjusted for cutting substantially the same thickness of chips or one cutting element can be adjusted to cut a thick chip and another cutting element can be adjusted to cut a thin chip.

6. A lathe turning tool that can be adjusted for turning a small diameter with tandem tools and all smaller diameters with a single tool, comprising a tandem tool holder that has a cutting element holder that can rotate about the longitudinal axis of its shank, said cutting element holder having a round shank, said cutting element holder having the cutting edge of the lower cutting element on approximately the horizontal plane that passes through the lathe's center of rotation, said cutting element holder having an inclined surface to said horizontal plane along which the upper cutting element can be adjusted thereby providing space for chips between the cutting elements, said upper cutting element having means of attaching to said inclined surface whereby it can be adjusted to cut on substantially the same diameter of the workpiece as the lower cutting element, mechanical means of rotating said cutting element holder about the longitudinal axis of its shank thereby offsetting the lower cutting element beyond the upper cutting element in the direction the cutting elements move when turning a diameter on a workpiece, said offset being an amount whereby both cutting elements cut separate helical paths from substantially the same workpiece diameter when the proper lathe feed is used, and without adjusting one cutting element relative to the other cutting element all workpiece diameters smaller than the diameter for which the upper cutting element is adjusted can be cut with said lower cutting element.

7. A lathe turning tool comprising a tandem tool holder having at least two cutting elements one above the other that cut at substantially the same distance from the lathe's center of rotation, at least one of said cutting elements having a cutting edge on an eccentric, said cutting edge is offset from the cutting edge immediately thereabove in the direction the cutting elements move when turning thereby providing for said cutting edges that are offset from each other to cut separate helical paths on the workpiece circumference, at least one of said cutting elements having a separate shank and said holder having means of rotating said separate shank about its longitudinal axis thereby changing the amount the cutting edge on said separate shank is offset from the cutting edge above it whereby said cutting edge on said separate shank can be adjusted to cut chips of different thickness.

8. A lathe turning tool, comprising a tandem tool that is held in a lathe turret, said lathe turret having means of holding said tandem tool and single cutting elements, said tandem tool having at least two cutting elements one above the other that cut at substantially the same distance from the lathe's center of rotation, at least one of said tandem cutting elements to be offset from the one immediately thereabove in the direction the cutting elements move when turning thereby providing for each cutting element to cut separate helical paths on the workpiece circumference, said tandem cutting elements to be mounted on a round shank, said round shank to be held in a recess in a lathe turret, said recess in said turret to be sufficiently deep whereby the cutting elements in the tandem tool and the single cutting elements held in the turret can all be adjusted to approximately the same distance from the center of the turret, and said recess having an abutment surface against which screws in the tandem tool can push thereby providing mechanical means of rotating the shank of said tandem tool about its longitudinal axis to offset one cutting element relative to another in the direction the cutting elements move when turning.

References Cited in the file of this patent

UNITED STATES PATENTS

| 1,405,605 | Madison | Feb. 7, 1922 |
| 2,368,736 | Wyrick | Feb. 6, 1945 |
| 2,472,255 | Kyle et al | June 7, 1949 |
| 2,505,684 | McClernon | Apr. 25, 1950 |
| 2,903,781 | Hudson | Sept. 15, 1959 |
| 2,949,662 | Cook | Aug. 23, 1960 |

FOREIGN PATENTS

| 19,607 | Great Britain | Oct. 1, 1901 |